United States Patent
Volkerink et al.

(10) Patent No.: US 12,204,976 B2
(45) Date of Patent: *Jan. 21, 2025

(54) VEHICLE CENTRIC LOGISTICS MANAGEMENT

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/951,402

(22) Filed: Sep. 23, 2022

(65) Prior Publication Data

US 2023/0123070 A1  Apr. 20, 2023

Related U.S. Application Data

(63) Continuation of application No. 16/776,804, filed on Jan. 30, 2020, now Pat. No. 11,487,985, which is a (Continued)

(51) Int. Cl.
*G06K 19/077* (2006.01)
*B32B 37/06* (2006.01)
(Continued)

(52) U.S. Cl.
CPC ........ *G06K 19/07773* (2013.01); *B32B 37/06* (2013.01); *B32B 37/12* (2013.01);
(Continued)

(58) Field of Classification Search
CPC ....... G06K 19/07773; G06K 19/06037; G06K 19/0702; B32B 37/06; B32B 37/12;
(Continued)

(56) References Cited

U.S. PATENT DOCUMENTS

| | | |
|---|---|---|
| 4,785,463 A | 11/1988 | Janc et al. |
| 5,999,091 A | 12/1999 | Wortham |

(Continued)

FOREIGN PATENT DOCUMENTS

| | | |
|---|---|---|
| AU | 2018204317 A1 | 1/2019 |
| CA | 3 008 512 A1 | 12/2018 |

(Continued)

OTHER PUBLICATIONS

Examination Report No. 1 for Australian Patent Application No. 2020216093 dated Sep. 29, 2022, 4 pages.

(Continued)

*Primary Examiner* — Seung H Lee

(57) ABSTRACT

In embodiments, a method includes communicating, by a primary wireless network node associated with a first vehicle section of a vehicle, with a secondary wireless network node associated with a second vehicle section of a vehicle. The method primary wireless network node determines that the first vehicle section is compatible with the second vehicle section based on the communications with the secondary wireless network node and based on at least one of a first compatibility requirement of the first vehicle section and a second compatibility requirement of the second vehicle section. The primary wireless network node communicates with a server associated with a tracking system, using a second type of wireless communications interface.

20 Claims, 8 Drawing Sheets

Related U.S. Application Data continuation-in-part of application No. 16/581,599, filed on Sep. 24, 2019, now Pat. No. 11,328,201, and a continuation-in-part of application No. 16/383,353, filed on Apr. 12, 2019, now Pat. No. 10,872,286, said application No. 16/581,599 is a continuation of application No. 15/842,867, filed on Dec. 14, 2017, now Pat. No. 10,445,634, said application No. 16/383,353 is a continuation of application No. 15/842,861, filed on Dec. 14, 2017, now Pat. No. 10,262,255.

(60) Provisional application No. 62/800,420, filed on Feb. 1, 2019, provisional application No. 62/435,207, filed on Dec. 16, 2016, provisional application No. 62/434,218, filed on Dec. 14, 2016.

(51) Int. Cl.
| | |
|---|---|
| *B32B 37/12* | (2006.01) |
| *C09J 7/38* | (2018.01) |
| *G06K 19/06* | (2006.01) |
| *G06K 19/07* | (2006.01) |
| *H04W 4/029* | (2018.01) |
| *H04W 4/02* | (2018.01) |

(52) U.S. Cl.
CPC .......... *C09J 7/38* (2018.01); *G06K 19/06037* (2013.01); *G06K 19/0702* (2013.01); *H04W 4/029* (2018.02); *B32B 2457/00* (2013.01); *C09J 2203/326* (2013.01); *C09J 2301/124* (2020.08); *C09J 2301/302* (2020.08); *C09J 2301/40* (2020.08); *C09J 2463/00* (2013.01); *H04W 4/027* (2013.01)

(58) Field of Classification Search
CPC ... B32B 2457/00; C09J 7/38; C09J 2203/326; C09J 2301/124; C09J 2301/302; C09J 2301/40; C09J 2463/00; H04W 4/029; H04W 4/027; H04W 4/02; H04W 4/38; H04W 4/80; H04W 4/40
See application file for complete search history.

(56) References Cited

U.S. PATENT DOCUMENTS

| | | | |
|---|---|---|---|
| 6,437,702 | B1 | 8/2002 | Ragland et al. |
| 6,522,874 | B1 | 2/2003 | Chu et al. |
| 6,972,682 | B2 | 12/2005 | Lareau et al. |
| 7,273,172 | B2 | 9/2007 | Olsen, III et al. |
| 7,696,862 | B2 | 4/2010 | Herschell et al. |
| 7,866,555 | B2 | 1/2011 | Schmid et al. |
| 7,922,085 | B2 | 4/2011 | Thomas et al. |
| 8,095,070 | B2 | 1/2012 | Twitchell, Jr. |
| 8,413,997 | B1 | 4/2013 | Coombs |
| 9,721,226 | B2 | 8/2017 | Minogue et al. |
| 9,886,799 | B2 | 2/2018 | Kwak |
| 10,244,364 | B1 | 3/2019 | Beard |
| 10,679,172 | B2 | 6/2020 | Burch, V et al. |
| 10,748,109 | B2 | 8/2020 | Benjamin et al. |
| 11,115,732 | B2 | 9/2021 | Lucrecio et al. |
| 11,487,985 | B2 * | 11/2022 | Volkerink .......... G06K 19/0702 |
| 2003/0205869 | A1 | 11/2003 | Schutt |
| 2003/0227382 | A1 | 12/2003 | Breed |
| 2004/0224630 | A1 | 11/2004 | MacFarland |
| 2005/0028504 | A1 | 2/2005 | Gramm |
| 2005/0146423 | A1 | 7/2005 | Hattori |
| 2006/0087419 | A1 | 4/2006 | Peng |
| 2006/0197652 | A1 | 9/2006 | Hild et al. |
| 2007/0229240 | A1 | 10/2007 | Yasuda |
| 2008/0100450 | A1 | 5/2008 | Ayyagari et al. |
| 2008/0147277 | A1 | 6/2008 | Lu |
| 2008/0228352 | A1 | 9/2008 | Brookes |
| 2008/0252025 | A1 | 10/2008 | Plath |
| 2009/0016308 | A1 | 1/2009 | Twitchell, Jr. |
| 2009/0018721 | A1 | 1/2009 | Mian |
| 2009/0265038 | A1 | 10/2009 | Ramsey |
| 2012/0232942 | A1 | 9/2012 | Gaug et al. |
| 2014/0163857 | A1 | 6/2014 | Melum et al. |
| 2014/0344118 | A1 | 11/2014 | Parpia et al. |
| 2015/0206096 | A1 | 7/2015 | Fernandez |
| 2015/0239354 | A1 | 8/2015 | Gorai |
| 2015/0248838 | A1 | 9/2015 | Stone et al. |
| 2015/0349917 | A1 | 12/2015 | Skaaksrud |
| 2016/0066137 | A1 | 3/2016 | Kulkarni et al. |
| 2017/0140656 | A1 | 5/2017 | Mott et al. |
| 2017/0243367 | A1 | 8/2017 | Lee |
| 2018/0039266 | A1 | 2/2018 | Dotzler et al. |
| 2018/0096289 | A1 | 4/2018 | Terwilliger et al. |
| 2018/0097884 | A1 | 4/2018 | Terwilliger et al. |
| 2018/0301875 | A1 | 10/2018 | Burroughs |
| 2018/0365636 | A1 | 12/2018 | Lucrecio et al. |
| 2019/0039431 | A1 | 2/2019 | Vaughan |
| 2019/0101650 | A1 | 4/2019 | McKeown et al. |
| 2019/0210518 | A1 | 7/2019 | Michalakis |
| 2019/0222055 | A1 | 7/2019 | Khoche |
| 2019/0236732 | A1 | 8/2019 | Speasl |
| 2019/0315319 | A1 | 10/2019 | Williams |
| 2019/0340483 | A1 | 11/2019 | Khoche |
| 2020/0051015 | A1 | 2/2020 | Davis |
| 2020/0137360 | A1 | 4/2020 | Somers et al. |
| 2020/0300960 | A1 | 9/2020 | Murphy |
| 2020/0375106 | A1 | 12/2020 | Seiders |
| 2021/0031734 | A1 | 2/2021 | Wolf |
| 2021/0094377 | A1 | 4/2021 | Coerman |
| 2021/0284449 | A1 | 9/2021 | Rogers |
| 2021/0319683 | A1 | 10/2021 | Daw Perez et al. |
| 2022/0032704 | A1 | 2/2022 | Desourdy |
| 2022/0161786 | A1 | 5/2022 | Javaid |

FOREIGN PATENT DOCUMENTS

| | | |
|---|---|---|
| WO | WO 2017109845 A1 | 6/2017 |
| WO | WO 2018/053309 A1 | 3/2018 |

OTHER PUBLICATIONS

International Preliminary Report on Patentability for International Patent Application No. PCT/US2020/014521 dated Jul. 27, 2021, 6 pages.

International Search Report and Written Opinion of the International Searching Authority for International Patent Application No. PCT/US2020/055408 dated Feb. 25, 2021, 11 pages.

Office Action for Canadian Patent Application No. 3,128,524 dated Oct. 12, 2022, 6 pages.

Partial Supplementary European Search Report for European Patent Application No. 20747574.0 dated Sep. 16, 2022, 3 pages.

Examination Report No. 1 for Australian Patent Application No. 2020368350 dated Sep. 30, 2022, 6 pages.

Examination Report No. 2 for Australian Patent Application No. 2020368350 dated Apr. 24, 2023, 5 pages.

Examination Report No. 3 for Australian Patent Application No. 2020368350 dated Sep. 21, 2023, 6 pages.

Examination Report No. 4 for Australian Patent Application No. 2020368350 dated Sep. 28, 2023, 5 pages.

Singapore patent application No. 11202108404S Written Opinion dated Sep. 1, 2023, 7 pages.

Canadian Examination Report in related Canadian Patent Application No. 3,128,524, mailed Sep. 29, 2023, 4 pages.

\* cited by examiner

VEHICLE CENTRIC LOGISTICS MANAGEMENT

RELATED APPLICATIONS

This application is continuation of U.S. patent application Ser. No. 16/776,804, filed on Jan. 30, 2020, now U.S. Pat. No. 11,487,985, which claims priority to U.S. Provisional Patent Application No. 62/800,420, filed on Feb. 1, 2019. U.S. Pat. No. 11,487,985 is also a continuation-in-part of U.S. patent application Ser. No. 16/383,353, filed on Apr. 12, 2019, now U.S. Pat. No. 10,872,286, which is a continuation of U.S. patent application Ser. No. 15/842,861, filed on Dec. 14, 2017, now U.S. Pat. No. 10,262,255. U.S. patent application Ser. No. 15/842,861 claims priority to U.S. Provisional Patent Application No. 62/434,218, filed Dec. 14, 2016 and claims priority to U.S. Provisional Patent Application No. 62/435,207, filed Dec. 16, 2016. U.S. Pat. No. 11,487,985 is also a continuation-in-part of U.S. patent application Ser. No. 16/581,599, filed on Sep. 24, 2019, now U.S. Pat. No. 11,328,201, which is a continuation of U.S. patent application Ser. No. 15/842,867, filed Dec. 14, 2017, now U.S. Pat. No. 10,445,634. U.S. patent application Ser. No. 15/842,867 claims priority to U.S. Provisional Patent Application No. 62/434,218, filed Dec. 14, 2016, and claims priority to U.S. Provisional Patent Application No. 62/435,207, filed Dec. 16, 2016. All of the above referenced patent applications are incorporated herein in their entirety.

BACKGROUND

The disclosure generally relates to logistics and more particularly to asset management, including packaging, warehousing, inventorying, tracking, and monitoring items (e.g., objects, parcels, persons, tools and other equipment).

SUMMARY

In embodiments, a method includes communicating, by a primary wireless network node associated with a first vehicle section of a vehicle, with a secondary wireless network node associated with a second vehicle section of a vehicle, using a first type of wireless communications interface. The method primary wireless network node determines that the first vehicle section is compatible with the second vehicle section based on the communications with the secondary wireless network node and based on at least one of a first compatibility requirement of the first vehicle section and a second compatibility requirement of the second vehicle section. The primary wireless network node communicates with a server associated with a tracking system, using a second type of wireless communications interface, wherein the communicating with the server includes one or more of reporting data on the first vehicle section, data on the second vehicle section, and data on the compatibility between the first vehicle section and the second vehicle section.

In embodiments, a system includes a primary wireless network node in a first vehicle section including a driver compartment and a secondary wireless network node in a second vehicle section including a cargo compartment. The primary wireless network node includes a first type of wireless communications interface and a second type of communications interface. The primary wireless network node is associated with a first set of attributes characterizing capabilities of the first vehicle section.

The secondary wireless network node includes the second type of communications interface and a third type of wireless communications interface. The secondary wireless network node is associated with a second set of attributes characterizing requirements of the second vehicle section.

The primary wireless network node establishes, using the first type of wireless communications interface, a first wireless communications connection between the primary wireless network node and a server affiliated with a network service. The primary wireless network node also establishes, using the second type of communications interface, a second communications connection between the primary wireless network node and the secondary wireless network node. The secondary wireless network node establishes, using the third type of wireless communications interface, respective wireless communications connections between the secondary wireless network node and peripheral wireless network nodes in the cargo compartment that are affiliated with the network service. The primary wireless network node and the secondary network node are programmed to determine compatibility between the capabilities of the first vehicle section and the requirements of the second vehicle section based on a first received set of attributes characterizing capabilities of the first vehicle section being compatible with a received second set of attributes characterizing requirements of the second vehicle section, according to some embodiments.

In some embodiments, a system includes a primary wireless network node in a first vehicle section. The first vehicle section includes a driver compartment, according to embodiments. The primary wireless network node includes a first type of wireless communications interface and a second type of wireless communications interface.

The system includes a secondary wireless network node in a second vehicle section including a cargo compartment, wherein the secondary wireless network node includes the second type of wireless communications interface and a third type of wireless communications interface.

According to some embodiments, the primary wireless network node establishes, with the first type of wireless communications interface, a first wireless communications connection between the primary wireless network node and a server affiliated with a network service. The primary wireless network node establishes, with the second type of wireless communications interface, a second communications connection between the primary wireless network node and the secondary wireless network node. The secondary wireless network node establishes, with the third type of wireless communications interface, respective wireless communications connections between the secondary wireless network node and peripheral wireless network nodes in the cargo compartment that are affiliated with the network service. The primary wireless network node or the secondary wireless network node includes an electronic logging device (ELD) programmed to collect, analyze, and present vehicle driver performance data to a second network service.

The invention also features apparatus operable to implement the method described above and computer-readable media storing computer-readable instructions causing a computer to implement the method described above.

DETAILED DESCRIPTION

I. Introduction

In the following description, like reference numbers are used to identify like elements. Furthermore, the drawings are intended to illustrate major features of exemplary embodiments in a diagrammatic manner. The drawings are not intended to limit the disclosed aspects nor depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The term "module" may be hardware, software, or firmware or may be a combination or components thereof.

The term "tape node" refers to an adhesive tape platform or a segment thereof that includes wireless communications functionality and/or one or more of a sensor, a processor, a memory component, an energy source (e.g., a battery or an energy harvesting component). A tape node may have a variety of different form factors, including a multilayer roll or a sheet that includes a plurality of divisible adhesive segments. Once deployed, each tape node can function, for example, as an adhesive tape, label, sticker, decal, or the like, and as a wireless communications device. A "peripheral" tape node (also referred to as an "outer" node, a "leaf" node, and "terminal" node) refers to a tape node that does not have any child nodes.

In certain contexts, the terms "parcel," "envelope," "box," "package," "container," "pallet," "carton," "wrapping," and the like are used interchangeably herein to refer to a packaged item or items.

II. Exemplary Operating Environment

Figure 1:
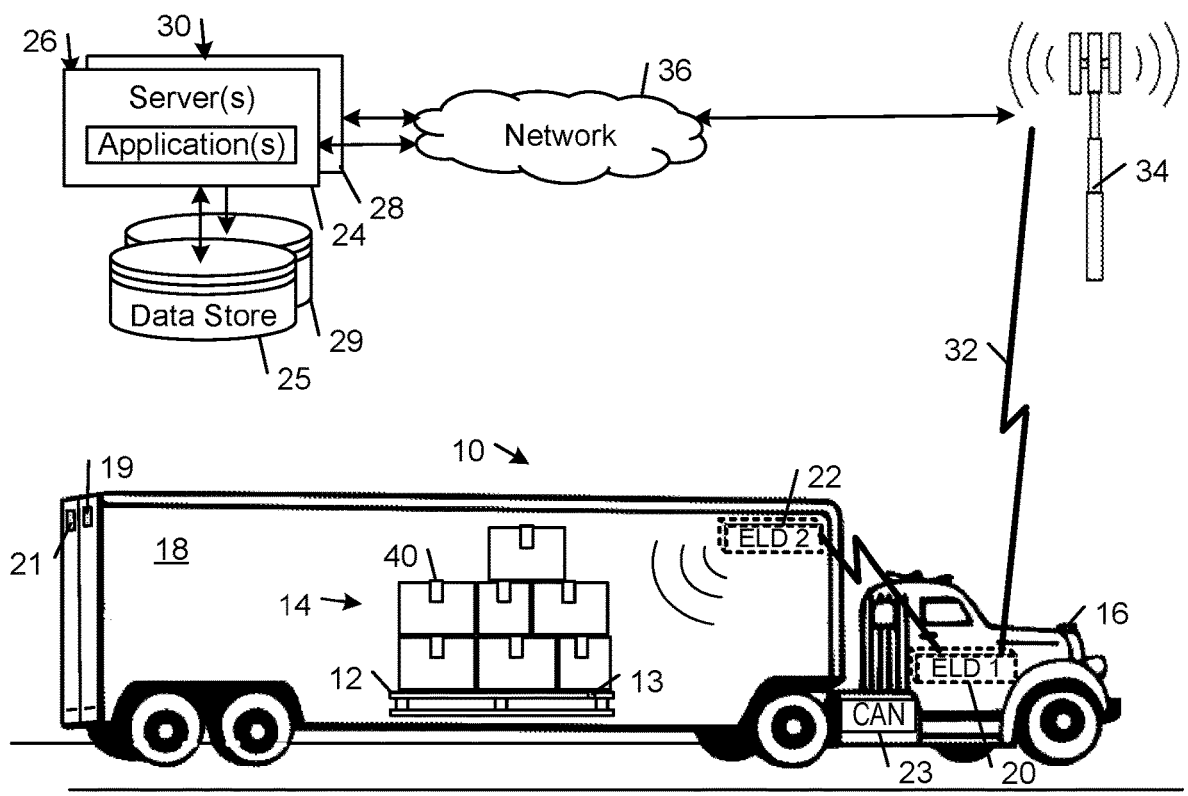
FIG. 1 is a schematic diagram of an example vehicle transporting a pallet of parcels while communicating with one or more network services.

FIG. 1 is a schematic diagram of an example vehicle 10 transporting a pallet 12 of parcels 14 containing goods or other things. In some embodiments, a tertiary wireless network node 13 is fixed to the pallet 12 and is configured to communicate wirelessly with the peripheral nodes 40 and the second electronic logging device 22. In this example, the vehicle 10 is a semi-trailer truck that includes a tractor unit 16 and a semi-trailer 18 that carries freight loaded through doors 19 and 21. In general, the vehicle 10 may be any type of vehicle that can transport goods or other things from one place to another, including any type of motorcycle, car, truck, van, train, ship, or aircraft.

In the illustrated example, the tractor unit 16 includes a primary electronic logging device 20 (i.e., a primary ELD) and the semi-trailer 18 includes a secondary electronic logging device 22 (i.e., a secondary ELD). In some examples, the primary ELD 20 and the secondary ELD 22 each includes one or more wireless transceivers, processors, and memory devices storing programmatic instructions that enable wireless communications over multiple different wireless communications protocols and technologies across different power levels and ranges, such as, but not limited to, GSM, CDMA, TDMA, WCDMA, EDGE, OFDM, GPRS, EV-DO, LTE, WiFi, LoRaWAN, Bluetooth LE, Z-wave, and Zigbee. The secondary ELD 22 typically includes wireless communications interfaces that have lower power and shorter range than the communications interfaces in the primary ELD. The primary ELD 20 and the secondary ELD 22 have at least one communications interface (e.g., Bluetooth, LoRaWAN, and/or wired connection) in common so that they can communicate with one another.

In the illustrated example, the primary ELD 20 ("ELD 1") wirelessly communicates with a server 24 of a first network service 26 and server 28 of a second network service 30 over respective cellular connections 32 with a cell tower gateway 34 and over a communications network 36, which may be a private network or a public network (e.g., the Internet). Each of the network services 26, 30 includes respective ones of the network servers 24, 28 executing one or more applications and storing and retrieving data from respective data stores 25, 29. The network services 26, 30 may be, for example, a driver performance assessment service and a logistics management service.

In the illustrated example, the primary ELD 20 in the tractor unit 16 typically communicates with the first and second network services 26, 30 over one or more high-power, long-range communications interfaces. In addition, the primary ELD 20 wirelessly communicates with the secondary ELD 22 ("ELD 2") in the semi-trailer 18 over a lower power, shorter-range wireless communications interface, such as LoRaWAN or Bluetooth LE. In some examples, the primary ELD 20 also may communicate with the secondary ELD 22 over a wired connection through a controller area network (CAN) bus system 23, which is a vehicle bus standard designed to allow microcontrollers and devices to communicate with each other in applications using a message-based protocol without a host computer. The CAN bus system 23 also may connect the primary ELD 20 to the communications interface of a cellular modem that is installed in some embodiments of the tractor unit 16 of the semi-trailer truck 10, thereby enabling the primary ELD 20 to share the cellular modem's existing cellular subscription service.

The parcels 14 are associated with peripheral wireless network node devices that include wireless communications, processing, sensing and data storage capabilities. In some examples, these peripheral wireless network node devices are implemented as wireless electronic tags that are carried in or otherwise attached to or integrated with the respective ones of the parcels 14. Other examples incorporate the wireless communications, processing, sensing and data storage capabilities into a low-cost, multi-function adhesive tape platform 40 with a form factor that unobtrusively integrates the components useful for implementing a combination of different logistic functions and also is able to perform a useful ancillary function that otherwise would have to be performed with the attendant need for additional materials, labor, and expense. In some examples, the primary ELD 20 and the secondary ELD 22 are implemented as one or more segments of respective types of the adhesive tape platform described in US Patent Application Publication No. US-2018-0165568-A1, which was published on Jun. 14, 2018, and is incorporated in its entirety herein.

In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly into various logistic applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of logistics management, including sealing parcels, transporting parcels, tracking parcels, monitoring the conditions of parcels, inventorying parcels, and verifying package security. In these examples, the sealed parcels typically are transported from one location to another by truck, train, ship, or aircraft or within premises, e.g., warehouses by forklift, trolleys etc.

An adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, package tracking, person tracking, animal (e.g., pet) tracking, manufactured parts tracking, and vehicle tracking. In example embodiments, each segment of an adhesive tape platform is equipped with an energy source, wireless communication functionality, transducing functionality (e.g., sensor and energy harvesting functionality), and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

Figure 2:
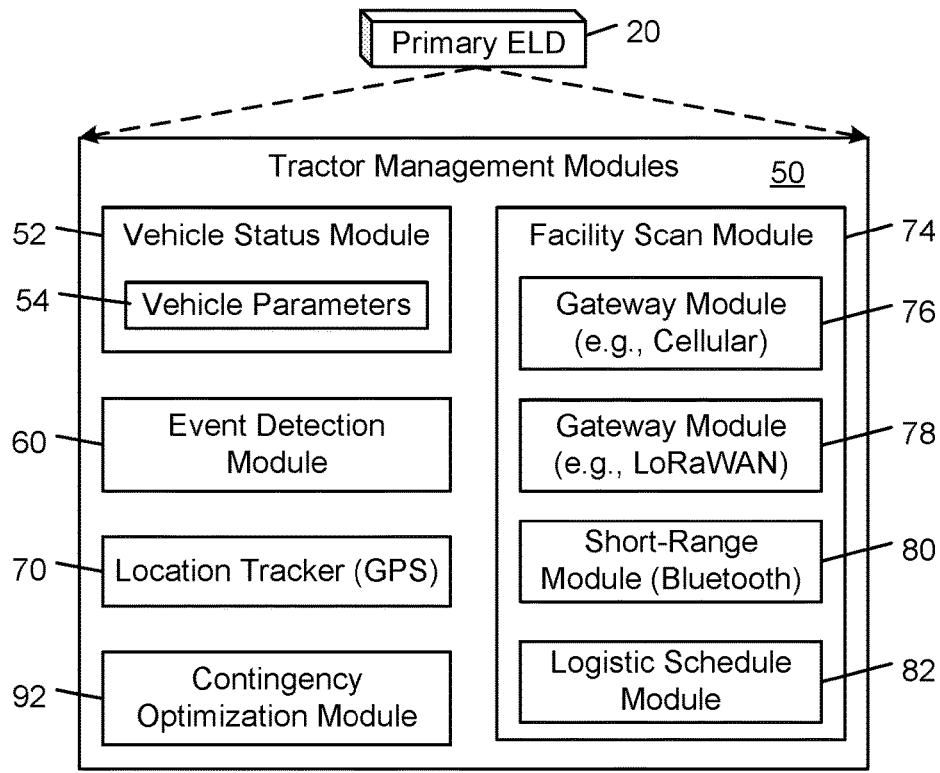
FIG. 2 is a block diagram of a set of example tractor management modules in an example of a primary electronic logging device (ELD).
Figure 3:
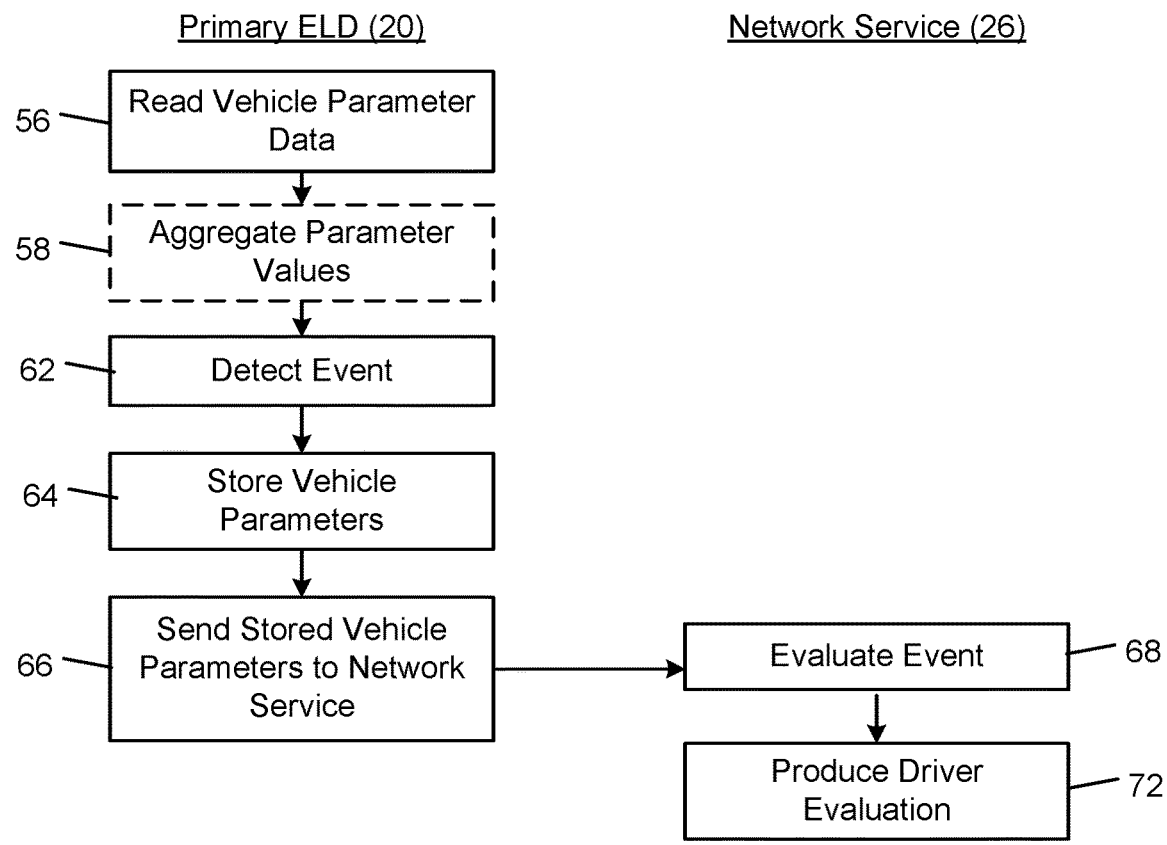
FIG. 3 is a flow diagram of an example method of producing a driver evaluation.

Referring to FIGS. 2 and 3, the primary ELD 20 ("ELD 1") includes a set of tractor management modules 50 for collecting, analyzing, and presenting vehicle management and driver performance data to the driver performance assessment service 26 that generates evaluation data, including a driver evaluation for a driver of the vehicle 10. The set of tractor management modules 50 also includes a set of facility scan modules for collecting, analyzing, and presenting logistic management data, including logistic schedule and parcel status information to the logistics management service 30.

The primary ELD 20 includes a processor (not shown) that executes a vehicle status module 52 to read and transmit vehicle parameter data 54 that is associated with the driver and the vehicle to the driver performance assessment service 26 over time (FIG. 3, block 56). In some examples, the primary ELD 20 also performs calculations (e.g., aggregating vehicle parameter data 54; FIG. 3, block 58) based on the collected vehicle parameter data 54, which includes one or more of: vehicle speed, deceleration, braking, air bag state, 4-way flasher state, engine revolutions per minute, windshield wiper state, a fog light state, steering input information, geographic location information, engine oil pressure, coolant level, driver emergency button state, tire pressure, and the like. In some examples, the vehicle status and performance parameter data 54 is obtained from sensors that are associated with respective components of the vehicle 10.

The primary ELD 20 also executes an event detection module 60 to determine whether any of the vehicle parameter data 54, taken alone or in combination, exceeds one or more predetermined thresholds which may constitute a driving event (FIG. 3, block 62). In some examples, the primary ELD processor executes one or more of the tractor management modules 50 to capture and store the detected vehicle parameter data 54 in a memory of the primary ELD 20 (FIG. 3, block 64). The primary ELD 20 executes the event detection module 60 to transmit vehicle parameter data 54, which was captured before, during, and/or after the detected driving event, to the driver performance assessment service 26 for evaluation (FIG. 3, block 66).

The driver performance assessment network service 26 may use the transmitted vehicle parameter data together with ancillary information to determine a performance score for the driver (FIG. 3, block 68). For example, the driver performance assessment network service 26 may use information about the location of the event, as determined by reading a location tracker module 70 in the primary ELD 20 that obtains a series of GPS coordinates over time (see FIG. 2). In addition to or instead of geographic location information, the driver performance assessment network service 26 may use estimates of the speed of the driver's vehicle 10 relative the speeds of nearby drivers, as determined from analyses of video data captured before, during, or after the event. The driver performance assessment network service 26 generates a performance score for the driver of the vehicle 10 based on an evaluation of the person who is determined to have triggered or caused the event (FIG. 3, block 72). For example, the driver performance assessment network service 26 may give the driver a low evaluation score if the driver is determined to have triggered or otherwise was a significant factor in causing the event. On the other hand, the driver performance assessment network service 26 may give the driver a high evaluation score if the driver is determined to not to have triggered or have been a significant factor in causing the event.

Referring back to FIG. 2, the tractor management modules 50 also includes a facility scan module 74 that includes a set of communications interface modules that perform wireless communications operations, including wirelessly identifying parcels and wirelessly determining the states of parcels in a facility. In some examples, the facility scan module 74 incorporates a hierarchy of communications modules, including a long-range gateway module 76, a medium-range gateway module 78, and a short-range peripheral module 80. In the illustrated embodiment that facility scan module 74 also has logistic schedule module 82 that includes a manifest or list of the parcels that are scheduled for pick up, drop off, or other logistic event involving the semi-trailer truck 10.

Figure 4:
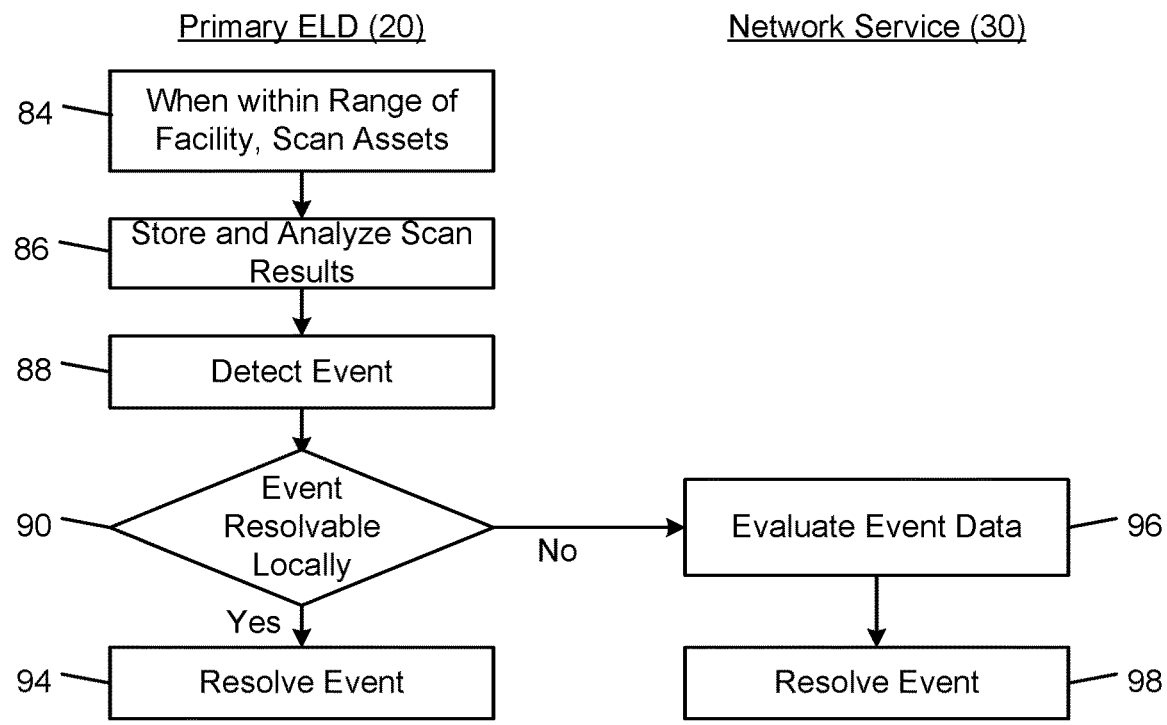
FIG. 4 is a flow diagram of an example method of responding to events associated with assets in a logistic facility.

Referring to FIG. 4, in an example, the primary ELD 20 starts scanning for assets in a target facility (e.g., a warehouse, a distribution center, or a retail establishment) when the vehicle 10 is within scanning range of the target facility (FIG. 4, block 84). In some examples, the primary ELD 20 broadcasts ping packets in response to a determination that the current GPS location of the vehicle 10 is within a predetermined scanning range of the target facility (e.g., 5 miles). In other examples, the primary ELD 20 may use one or more other criteria for determining when to start scanning a target facility.

In an example, the primary ELD 20 executes a long range (e.g., cellular) communications interface module 76 to broadcast to the target facility ping packets that include identifiers that have been assigned to the peripheral wireless network nodes (e.g., tape nodes) that are associated with the respective parcels in the manifest. In some examples, the target facility includes a gateway that includes a cellular communications interface and a short-range communications interface (e.g., Bluetooth LE). In these examples, the gateway receives the cellular ping packets broadcasted from the vehicle 10 and broadcasts the ping packets through a short-range communications interface (e.g., Bluetooth LE) within the target facility. The peripheral wireless network nodes that are associated with identifiers in the list and are present in the target facility respond to the ping packets by broadcasting response packets from their respective short-range communications interfaces (e.g., Bluetooth LE) to the gateway, which broadcasts the response packets to the vehicle 10 through its long-range communications interface (e.g., cellular).

Other examples may use different sets of hierarchical communications devices. For example, a large facility may include multiple gateways that have different sets of communications interfaces to achieve complete communication coverage of the peripheral wireless network nodes associated with parcels in the facility.

After scanning a facility, the primary ELD 20 stores and analyzes the scan results (FIG. 4, block 86). The scan results may confirm that all the parcels listed in the logistic schedule module 82 (FIG. 2) are in the target facility. Alternatively, the scan results may reveal the occurrence of one or more predefined events relating to the parcels listed in the logistic schedule module 82. For example, a "missing parcel" event occurs when a parcel listed in the logistic schedule module 82 does not respond to a ping packet or is not in the facility. A "misrouted parcel" event occurs when a parcel is loaded on the wrong vehicle. An "unfit parcel" event occurs when a parcel listed in the logistic schedule module 82 is damaged or otherwise unfit for delivery to the end customer. An "improper joinder" event occurs when a parcel is incorrectly designated as part of a group of parcels. An "improper removal" event occurs when a parcel is improperly removed from a designated group. The logistics management network service 30 may define other events as needed.

Based on the analysis of the stored scan results and the event definitions, the primary ELD 20 on the tractor unit 16 of the vehicle 10 determines whether any of the predetermined events have been detected (FIG. 4, block 88).

For each event that has been detected, the primary ELD 20 determines whether or not the event can be resolved locally, without the intervention of the logistics management network service 30 (FIG. 4, block 90). In some examples, the primary ELD 20 accesses a contingency optimization module 92 (shown in FIG. 2). In some examples, the contingency optimization module 92 contains a set of programmatic instructions or rules for resolving events without the intervention of the logistics management network service 30.

For example, in response to the detection of a "missing parcel" event, the primary ELD 20 logs the event type and other details relating to the event in memory and, based on a mapping between the "missing parcel" event type and the instructions contained in the contingency optimization module 92, the primary ELD 20 executes the relevant instructions in the contingency optimization module 92. In some cases, the primary ELD 20 may be instructed to re-broadcast ping packets to the peripheral wireless network node associated with the non-responsive parcel using a different (e.g., higher) power level and/or a different communications protocol in an attempt to resolve the event (FIG. 4, block 94).

In another example, in response to a "misrouted parcel" event, the primary ELD 20 logs the event type and other details relating to the event in memory and, based on a mapping between the "missing parcel" event type and the instructions contained in the contingency optimization module 92, the primary ELD 20 executes the relevant instructions in the contingency optimization module 92. In some cases, the primary ELD 20 may be instructed to broadcast across the facility ping packets that include the identifier of the peripheral wireless network node associated with the parcel of the same type that was misrouted in an attempt to resolve the event (FIG. 4, block 94).

In another example, in response to the detection of an "unfit parcel" event resulting from exposure of a parcel to, for example, a temperature or an acceleration level greater than the respective threshold levels, the primary ELD 20 executes the relevant instructions in the contingency optimization module 92. Based on the current geographic location of the vehicle 10, the location of the nearest replacement part, and the timing of the next scheduled delivery for the vehicle 10, the contingency optimization module 92 instructs primary ELD 20 to broadcast to the facility ping packets that include one or more identifiers of replacement parcels of the same type of the unfit parcel in an attempt to resolve the event (FIG. 4, block 94). The primary ELD 20 may also instruct the vehicle's driver interface system to display instructions to turn back to the last facility visited and obtain the replacement part instead of continuing directly to the next facility.

If the event is not resolvable locally (FIG. 4, block 90), the primary ELD 20 transmits the relevant data relating to the detected event to the logistics management network service 30 over a long-range (e.g., cellular) communications interface. The logistics management network service 30 evaluates the event data (FIG. 4, block 96) and resolves the event (FIG. 4, block 98). In some examples, the logistics management network service 30 executes a logistics optimization program that takes into account the current locations and costs of vehicles, facilities, and package contents, road and traffic conditions, costs of late or failed delivery, and other factors to determine a global optimal solution for resolving the event.

For example, in response to a "improper joinder" event, the primary ELD 20 logs the event type and other details relating to the event in memory and, based on a mapping between the "improper joinder" event type and the instructions contained in the contingency optimization module 92, the primary ELD 20 executes the relevant instructions in the contingency optimization module 92. In some cases, the primary ELD 20 may be instructed to log information retrieved from the improperly joined wireless tape node and report the improper inclusion of the identified wireless tape node to the logistics management network service 30 in an attempt to resolve the event (FIG. 4, block 94).

In another example, in response to a "improper removal" event, the primary ELD 20 logs the event type and other details relating to the event in memory and, based on a mapping between the "improper removal" event type and the instructions contained in the contingency optimization module 92, the primary ELD 20 executes the relevant instructions in the contingency optimization module 92. In some cases, the primary ELD 20 may be instructed to log information retrieved from the improperly removed wireless tape node and parcel, and report the improper removal of the identified wireless tape node to the logistics management network service 30 in an attempt to resolve the event (FIG. 4, block 98).

Figure 5:
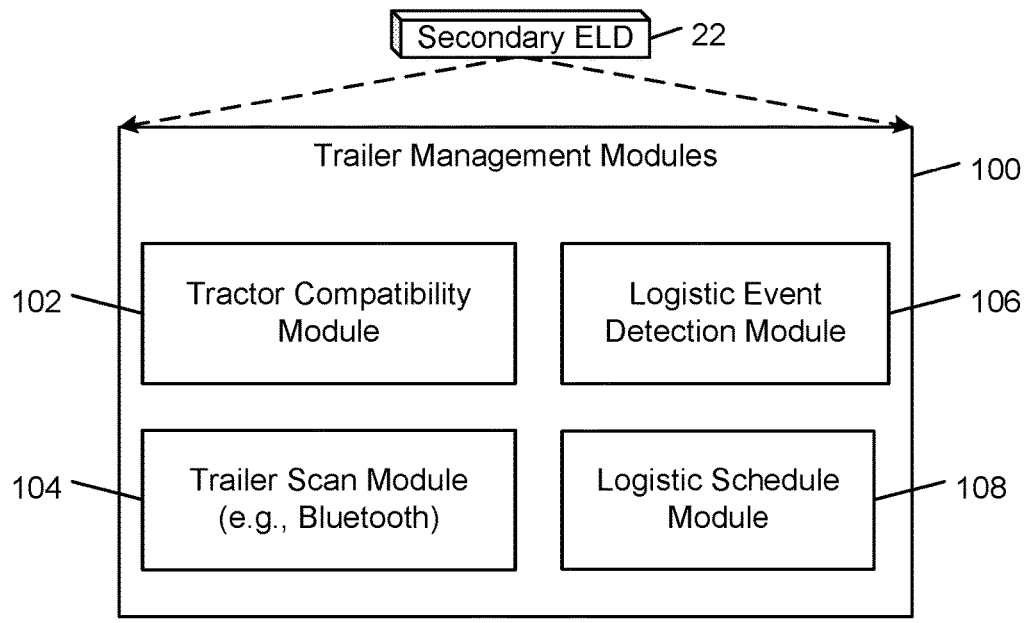
FIG. 5 is a block diagram of a set of example trailer management modules in an example of a secondary electronic logging device (ELD).

Referring to FIG. 5, as explained above, the primary ELD 20 ("ELD 1") in the tractor unit 16 communicates with the secondary ELD 22 ("ELD 2") in the semi-trailer 18 over a wireless connection and/or a wired connection via the CAN bus 23, as explained above. The secondary ELD 22 includes a set of trailer management modules 100, including a tractor compatibility module 102, a trailer scan module 104, a logistic event detection module 106, and a logistic schedule module 108.

Figure 6:
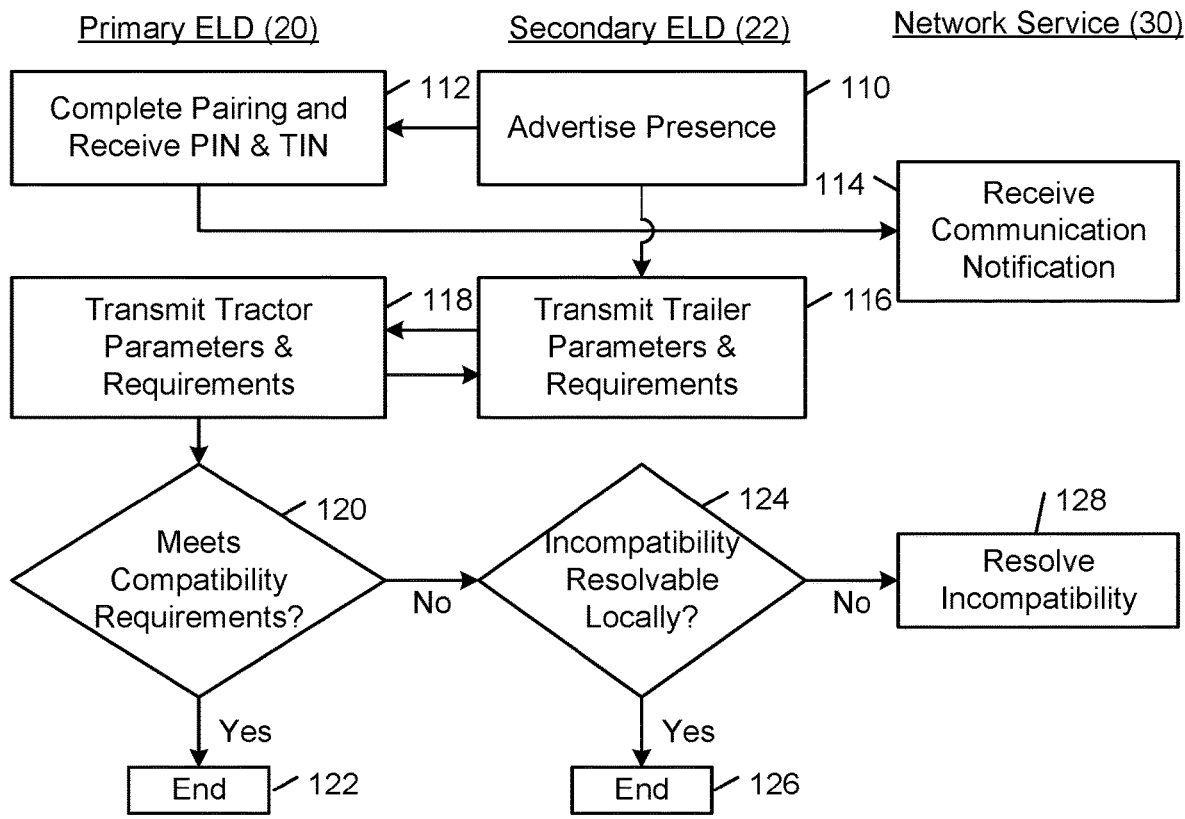
FIG. 6 is flow diagram of an example method of determining compatibility between a tractor and a trailer.

Referring to FIG. 6, a processor of the secondary ELD 22 executes the tractor compatibility module 102 to communicate with the primary ELD 20 in the tractor unit 16. In one example, to communicate with the primary ELD 20, the secondary ELD 22 advertises its presence with a specific authentication identifier and credentials (FIG. 6, block 110). When the primary ELD 20 receives data from the secondary ELD 22, the primary ELD 20 establishes a handshake with the secondary ELD 22 on the corresponding advertisement channel (FIG. 6, block 112). Then the primary ELD 20 hands off communication with the secondary ELD 22 to a data channel (e.g., a Bluetooth LE data channel). The primary ELD learns the secondary ELD's product identification number (PIN) and type identification number (TIN) of the secondary ELD 22 (FIG. 6, block 112) and transmits that information to the logistics management service 30 to let it know that the primary ELD 20 is communicating with the secondary ELD 22 (FIG. 6, block 114).

After establishing the data channel with the primary ELD 20 in the truck unit 16, the secondary ELD 22 in the semi-trailer 18 broadcasts the parameters, requirements, and itinerary of the semi-trailer 18 to the primary ELD 20 in the tractor unit 16 (FIG. 6, block 116). The primary ELD 20 in tractor unit 16 broadcasts its capabilities and evaluates the parameters and requirements received from the semi-trailer 18 (FIG. 6, block 118). The following descriptive language provides examples of the types and values of parameters and requirements for the tractor unit 16 and the semi-trailer 18:

```
var tractor = {
    "vehicle_type" : "tractor",
    "owner" : "wallmart",
    "max_acceleration" : "2.25 ft/s²",
    "max_haul_weight" : "20,000 lbs",
    "max_shock" : "2.1 ft/s²"
}
var itinerary = [{
    "goods_type" : "light_bulbs"
    "quantity" : "3,000"
    "destination" : "distribution_center_abc",
    "est_time_of_arrival" : "9:05am_01_04_2019"
},
{
    "goods_type" : "light_bulbs"
    "quantity" : "1,000"
    "destination" : "distribution_center_cde",
    "est_time_of_arrival" : "5:00_pm_01_06_2019"
},
{
    "goods_type" : "eggs"
    "quantity" : "1,500"
    "destination" : "warehouse_xyz",
    "est_time_of_arrival" : "9:30_am_01_06_2019"
}]
var trailer = {
    "vehicle_type" : "trailer",
    "owner" : "wallmart",
    "max_acceleration" : "2.5 ft/s²",
    "weight" : "15,000 lbs",
}
var freight = [{
    "goods_type" : "light_bulbs"
    "quantity" : "4,000"
    "max_shock" : "4.1 ft/s²"
    "scheduled_delivery_date" : "01_05_2019"
    "expiration_date" : "01_2029"
},
{
    "goods_type" : "eggs"
    "quantity" : "1,500"
    "max_shock" : "2.1 ft/s²"
    "scheduled_delivery_date" : "01_18_2019"
    "expiration_date" : "02_18_2019"
}]
```

In this example, the primary ELD 20 in the tractor unit 16 and the secondary ELD 22 in the semi-trailer 18 are configured to automatically evaluate each other's capabilities and requirements based on the exemplary descriptive language specifications for the tractor unit 16 and the semi-trailer 18. In the illustrated example, the tractor specification meets the trailer's requirements. For example, the tractor unit 16 and semi-trailer 18 are owned by the same company (i.e., Walmart), the maximum acceleration of the tractor unit 16 is below the maximum allowable trailer acceleration, the maximum shock level of the tractor unit 16 meets the maximum shock level for the freight carried by the semi-trailer 18, the scheduled delivery dates for the goods being conveyed in the trailer unit 16 are later than the estimated time of arrival. As a result, the capabilities and requirements of the tractor unit 16 meet all of the compatibility requirements of the semi-trailer 18 (FIG. 6, block 120) and the tractor unit 16 is matched to the semi-trailer 18 (FIG. 6, block 122).

If one or more of the capabilities of the tractor unit 20 did not meet one or more of the trailer unit 22 requirements, the secondary ELD 22 would determine whether or not the incompatibility is resolvable locally (FIG. 6, block 124). For example, the estimated time of arrival for the light bulbs at the "distribution_center_cde" is "5:00_pm_01_06_2019", which is after the scheduled delivery date of "01_05_2019". However, in some examples, the contingency optimization module 92 in the primary ELD 20 includes programmatic instructions or rules that instruct the primary ELD processor to accept a time of arrival that is not later than one day after the scheduled delivery date for non-perishable goods. In these examples, the incompatibility would be waived and the tractor unit 16 would be matched to the semi-trailer 18 (FIG. 6, block 126).

If the incompatibility between the tractor unit 16 and the semi-trailer 18 cannot be resolved locally, the primary ELD 20 reports the incompatibility to the logistics management network service 30. The logistics management network service 30 may resolve the incompatibility in any of a variety of different ways, ranging from waiving one or more incompatibilities to identifying another available tractor unit that matches or is at least a better match than the current tractor unit 16 (FIG. 6, block 102).

Referring back to FIG. 5, in addition to the tractor compatibility module 102, the trailer management modules 100 further include the trailer scan module 104, the logistic event detection module 106, and the logistic schedule module 108.

The secondary ELD 20 executes the trailer scan module 104 and the logistic schedule module 108 to perform wireless communications operations, including wirelessly identifying parcels and wirelessly determining the states of the parcels in the semi-trailer 18. In some examples, the trailer scan module 104 communicates with peripheral wireless network nodes that are associated with the parcels in the semi-trailer 18 over a short-range communications interface (e.g., Bluetooth LE).

Figure 7:
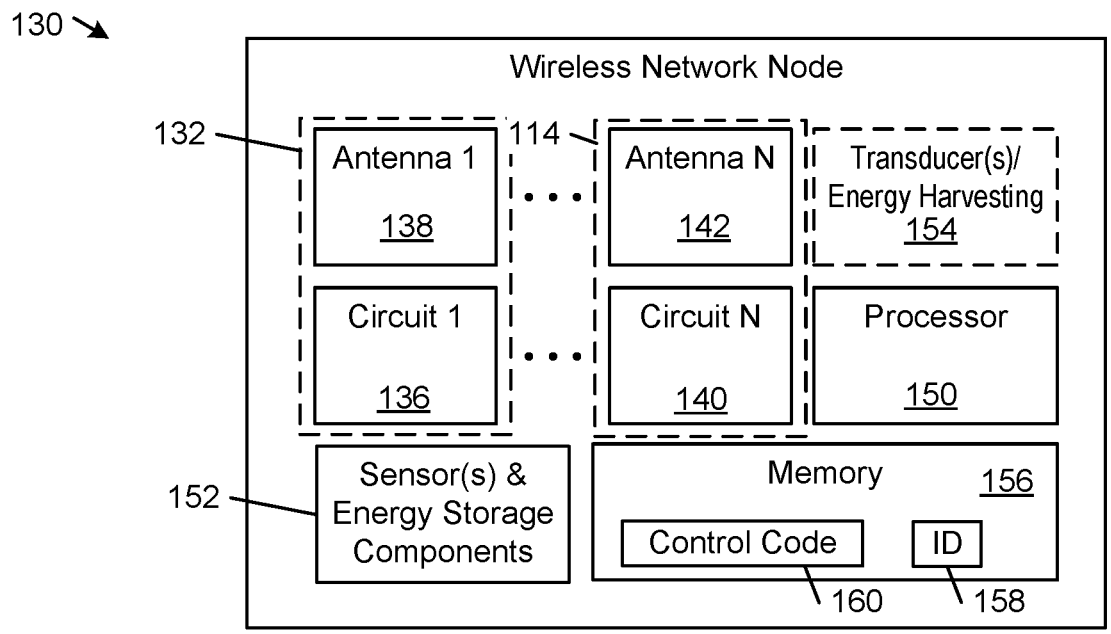
FIG. 7 is a schematic view of example components of a peripheral wireless network node.

FIG. 7 shows example components of an exemplary peripheral wireless network node 130. The peripheral wireless network node 130 includes a number of communication systems 132, 134. Example communication systems 132, 134 include a GPS system that includes a GPS receiver circuit 136 (e.g., a receiver integrated circuit) and a GPS antenna 138, and one or more wireless communication systems each of which includes a respective transceiver circuit 140 (e.g., a transceiver integrated circuit) and a respective antenna 142. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The peripheral wireless network node 130 also includes a processor 150 (e.g., a microcontroller or microprocessor), one or more sensors and energy storage devices 152 (e.g., non-rechargeable or rechargeable printed flexible battery, conventional single or multiple cell battery, and/or a super capacitor or charge pump), one or more transducers 154 (e.g., sensors and/or actuators, and, optionally, one or more energy harvesting transducer components). In some examples, the conventional single or multiple cell battery may be a watch style disk or button cell battery that is associated with electrical connection apparatus (e.g., a metal clip) that electrically connects the electrodes of the battery to contact pads on, for example, a flexible circuit board.

Examples of sensing transducers 154 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the peripheral wireless network node 130 includes a memory 156 that stores data including, for example, profile data, state data, event data, sensor data, localization data, security data, and one or more unique identifiers (ID) 158 associated with the peripheral wireless network node 130, such as a product ID number (PN), a type ID number (TIN), and a media access control (MAC) ID, and control code 160. In some examples, the memory 156 may be incorporated into one or more of the processor 150 or transducers 154, or may be a separate component that is integrated in the peripheral wireless network node 130 as shown in FIG. 7. The control code typically is implemented as programmatic functions or program modules that control the operation of the peripheral wireless network node 130, including a communication manager that manages the manner and timing of peripheral wireless network node communications, a peripheral wireless network node power manager that manages power consumption, and a peripheral wireless network node connection manager that controls whether connections with other network nodes are secure connections or unsecure connections, and a peripheral wireless network node storage manager that securely manages the local data storage on the peripheral wireless network node. The peripheral wireless network node connection manager ensures the level of security required by the end application is used and supports various encryption mechanisms. The peripheral wireless network node power manager and peripheral wireless network node communication manager work together to optimize the battery consumption for data communication. In some examples, execution of the control code by the different types of peripheral wireless network nodes described herein may result in the performance of similar or different functions.

Figure 8:
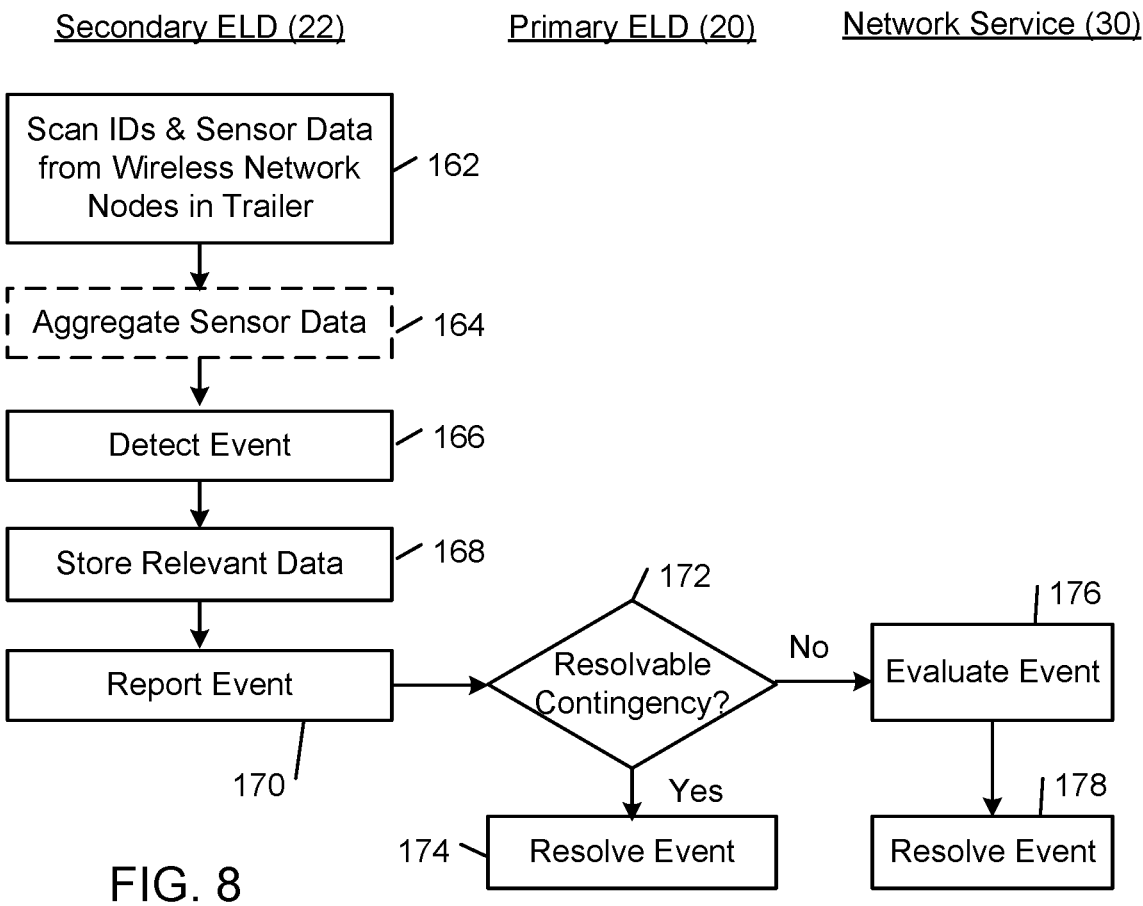
FIG. 8 is a flow diagram of an example method of detecting and responding to events involving assets in a trailer.

FIG. 8 shows an example method of detecting and responding to events involving assets in a trailer. The peripheral wireless network nodes 130 typically are associated with respective parcels in the semi-trailer 18. In some examples, the logistics management network service 30 programs the logistic schedule module 82 with programmatic code that is executed by the secondary ELD 22 in the semi-trailer 18 to scan peripheral wireless network nodes according to a fixed and/or a dynamic schedule. For example, the scheduled scan times may be one or a combination of irregular scan intervals, regular (e.g., periodic) intervals, and ad hoc intervals triggered, for example, by detected events.

In some examples, the secondary ELD 22 executes the trailer scan module 78 to read the IDs of the peripheral wireless network nodes in the semi-trailer 18 and also collect sensor data stored in the memories 136 of the peripheral wireless network nodes 110 in the semi-trailer 18 (FIG. 8, block 162). In some examples, the secondary ELD 22 aggregates the collected sensor data by data type (FIG. 7, block 164).

After scanning the semi-trailer 18, the secondary ELD 22 stores and analyzes the scan results to detect events (FIG. 8, block 166). Based on the analysis of the scan results and the event definitions, the secondary ELD processor in the semi-trailer 18 of the vehicle 10 determines whether any events have been detected. The scan results may confirm, for example, that all the parcels listed in the logistic schedule module 82 are in the semi-trailer 18. Alternatively, the scan results may reveal that one or more predefined events relating to the parcels occurred. For example, a "missing parcel" event occurs when a parcel listed in the logistic schedule module 82 does not respond to a ping packet broadcasted by the secondary ELD 22 or when such a parcel is not in the semi-trailer 18. An "unfit parcel" event occurs, for example, when a parcel listed in the logistic schedule module 82 is damaged or otherwise unfit for delivery to the end customer. For example, when a temperature sensor in a peripheral wireless network node 130 associated with a parcel registers one or more temperature readings that exceed or fall below a specified threshold temperature over a specified period of time, the contents of that parcel will be designated as being unfit for delivery. Similarly, when an acceleration or shock sensor in a peripheral wireless network node 130 associated with a parcel registers one or more acceleration or shock levels that exceed the specified threshold acceleration or shock levels over a specified period of time, the contents of that parcel will be designated as being unfit for delivery. The logistics management network service 30 may define other semi-trailer events as needed.

For each detected event (FIG. 8, block 166), the secondary ELD 22 stores the relevant data in memory (FIG. 8, block 168) and reports the event to the primary ELD 20 in the tractor unit 16 (FIG. 8, block 170). For each event that has been detected, the primary ELD 20 determines whether or not the event can be resolved locally, without the intervention of the logistics management network service 30 (FIG. 8, block 172). In some examples, the primary ELD 20 accesses the contingency optimization module 92 (FIG. 2), which contains a set of programmatic instructions or rules for resolving events without the intervention of the logistics management network service 30.

For example, in response to the detection of a "missing parcel" event, the primary ELD 20 in the tractor unit 16 logs the event type and other details relating to the event in memory and, based on a mapping between the "missing parcel" event type and the instructions contained in the contingency optimization module 92, the primary ELD 20 executes the relevant instructions in the contingency optimization module 92. In some cases, the primary ELD 20 may be instructed by the contingency optimization module 92 to re-broadcast ping packets to the peripheral wireless network node associated with the non-responsive parcel using a different (e.g., higher) power level and/or a different communications protocol in an attempt to resolve the event (FIG. 8, block 174).

In another example, in response to the detection of an "unfit parcel" event resulting from exposure to a temperature or an acceleration level greater than the respective threshold levels for these parameters, the primary ELD 20 executes the relevant instructions in the contingency optimization module 92. Based on the current geographic location of the vehicle 10, the location of the nearest replacement part, and the timing of the next scheduled delivery for the vehicle 10, the primary ELD 20 may be instructed to broadcast to the facility ping packets that include one or more identifiers associated with replacement parcels of the same type of the unfit parcel in an attempt to resolve the event (FIG. 8, block 174). In another example, the primary ELD 20 may instruct the vehicle's driver interface system to display instructions to turn back to the last facility visited and obtain the replacement items instead of directly continuing on to the next facility on the scheduled route.

If the event is not resolvable locally (FIG. 8, block 172), the primary ELD 20 transmits the relevant data relating to the detected event to the logistics management network service 30 over a long-range (e.g., cellular) communications interface. The logistics management network service 30 evaluates the event data (FIG. 8, block 176) and resolves the event (FIG. 8, block 178). In some examples, the logistics management network service 30 executes a logistics optimization program that takes into account the current locations of vehicles and facilities, their respective contents, road and traffic conditions, and other resources to determine a global optimal solution for resolving the event.

Figure 9:
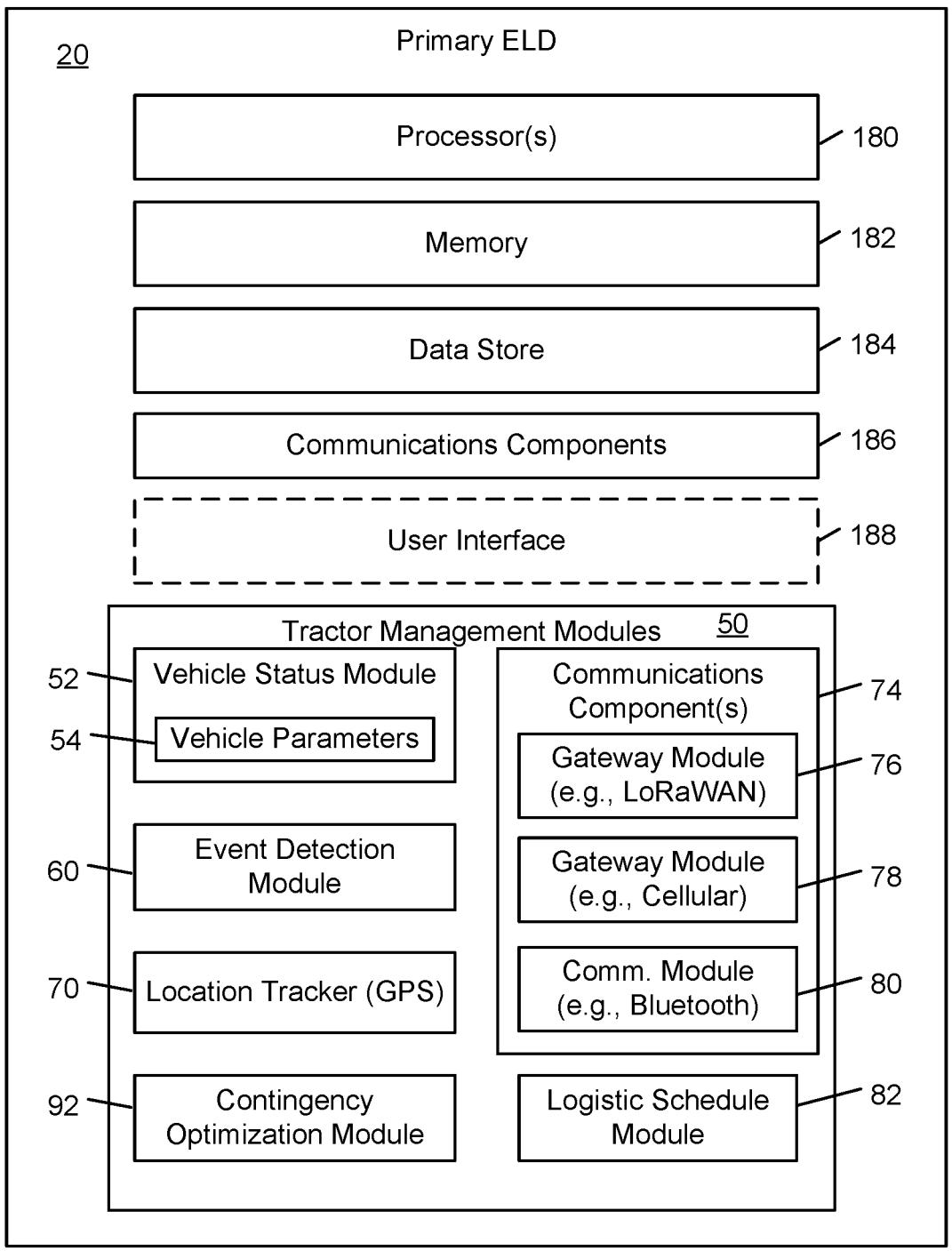
FIG. 9 is a block diagram of example components of a primary electronic logging device.

FIG. 9 shows an example embodiment of the primary ELD 20 that includes the tractor management modules 50 described above and further includes additional components that assist in providing the various functionalities of the primary ELD 20. These additional components may be implemented in computer or processor readable software or hardware instructions, firmware, hardware, or a combination of software, firmware, and hardware. For example, the features of the tractor management modules 50 described herein may be implemented in or executed by a combination of processor(s) 180, memory 182, data store 184, one or more communications interfaces 186, and an optional graphical or verbal user interface 188. In an example, the tractor management modules 50 may be encoded in a non-transitory computer-readable medium, such as the memory 182 or the data store 184. In addition, the communications components 186 are configured to interface with the processor 160, the memory 182, the data store 184, and the optional user interface 188 over one or more data buses. The communications components 186 also are able to establish wireless communications connections with remote systems, devices, and modules. The user interface of the primary ELD 20 may be configured to receive inputs and, in response, generate outputs. The user interface component 188 may include one or more input devices (e.g., a computer keyboard, a computer mouse, and a microphone) and one or more output devices (e.g., a computer monitor and speakers).

Figure 10:
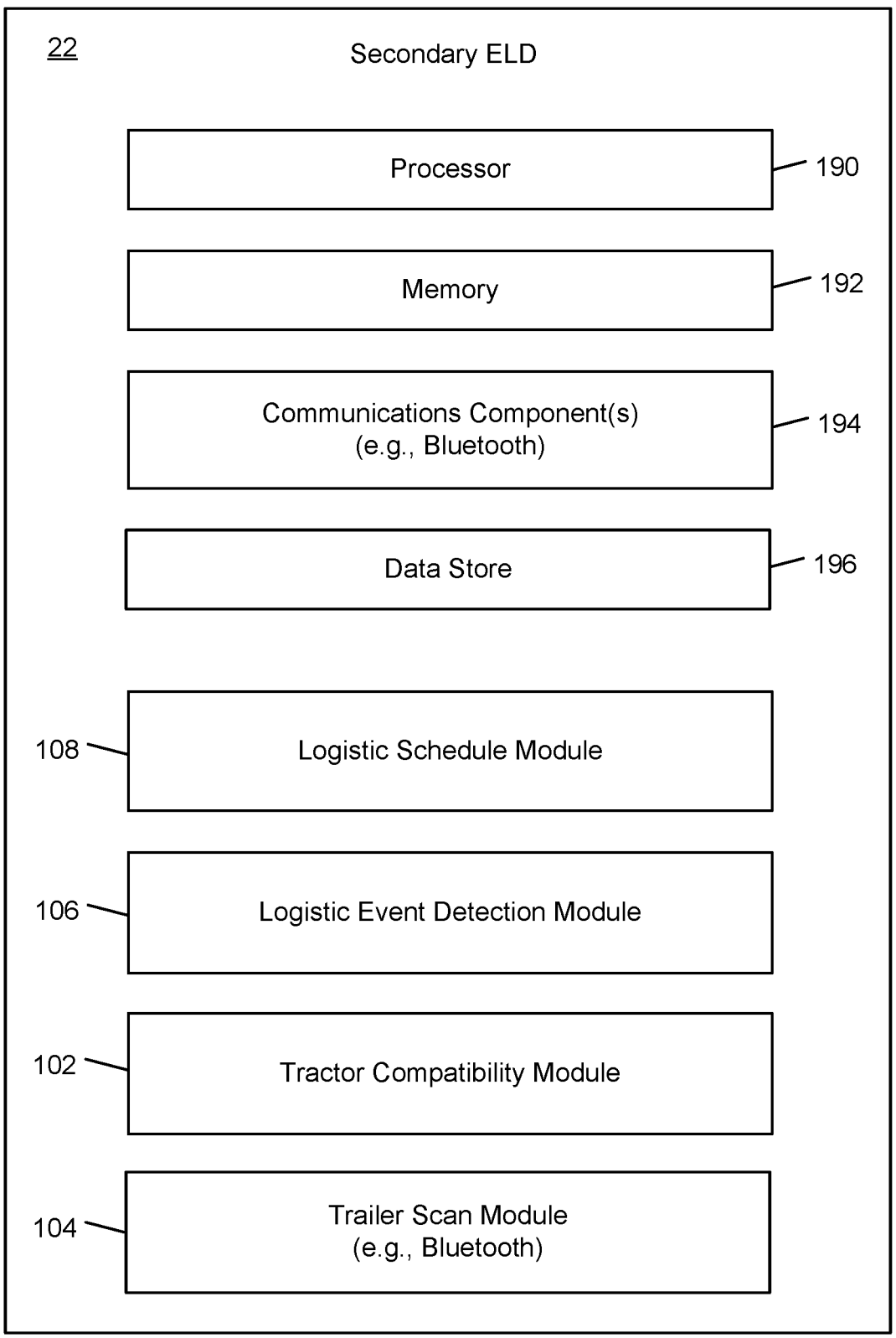
FIG. 10 is a block diagram of example components of a peripheral electronic logging device.

FIG. 10 shows an example embodiment of the secondary ELD 22 that includes the trailer management modules 100 described above and further includes additional components that assist in providing the various functionalities of the secondary ELD 22. These additional components may be implemented in computer or processor readable software, hardware instructions, firmware, hardware, or a combination of software, firmware, and hardware. For example, the features of the trailer management modules 100 described herein may be implemented in or executed by a combination of processor(s) 190, memory 192, data store 196, and one or more communications interfaces 194. In an example, the trailer management modules 100 may be encoded in a non-transitory computer-readable medium, such as the memory 192 or the data store 196. In addition, the communications components 194 are configured to interface with the processor 190, the memory 192, and the data store 196 over one or more data buses. The communications components 194 also are able to establish wireless communications connections with remote systems, devices, and modules. The communications interface(s) of the secondary ELD 22 may be configured to receive wireless inputs and, in response, generate outputs.

Figure 11:
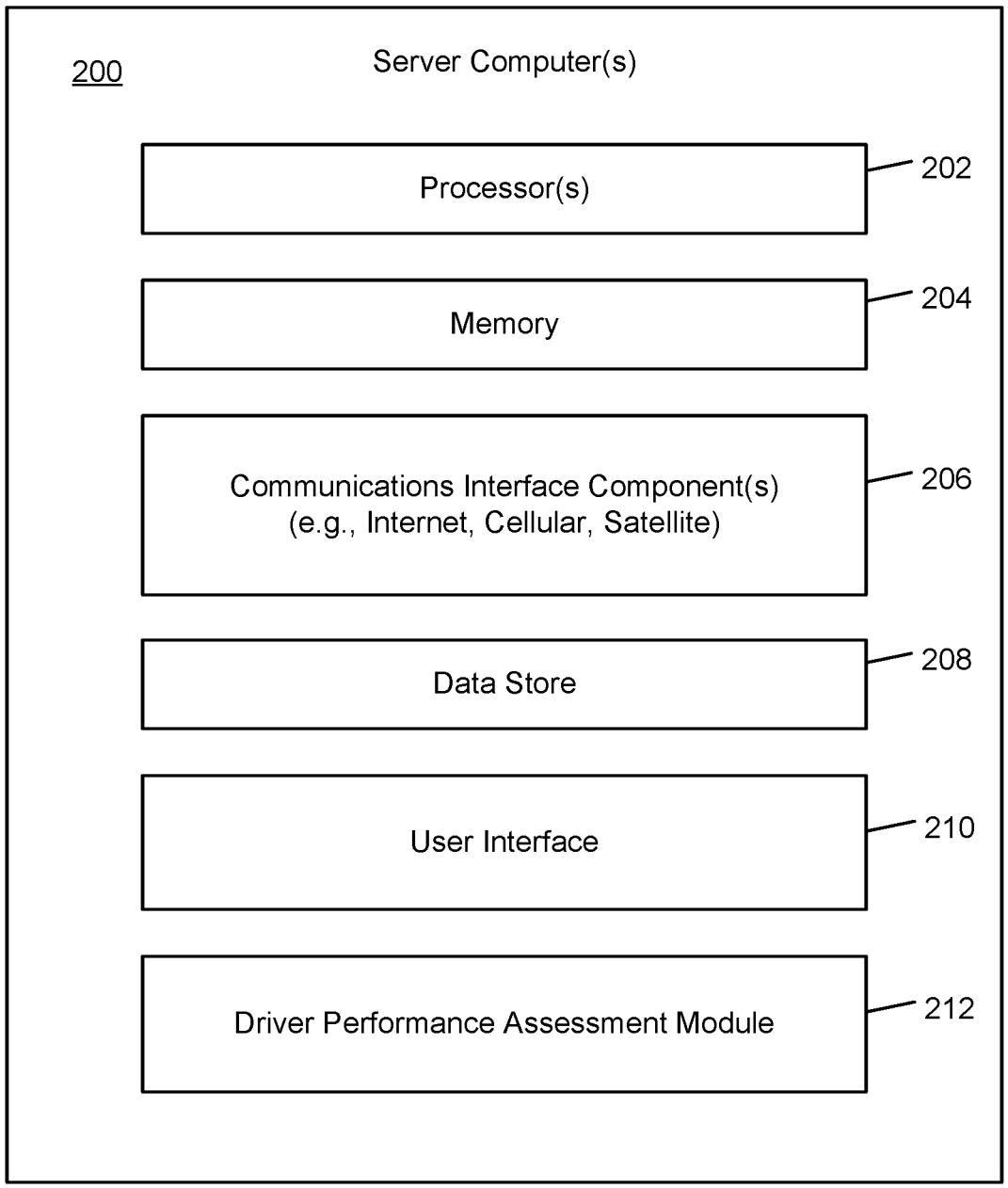
FIG. 11 is a block diagram of example components of a server computer.

FIG. 11 shows an example embodiment of the driver performance assessment service 26 that includes a driver performance assessment module 212. In some examples, the driver performance assessment service 26 includes one or more server computers 200 at least one of which includes the driver performance assessment module 212 for producing a driver evaluation and additional components that assist in providing the various functionalities of the driver performance assessment service 26. These additional components may be implemented in computer or processor readable software, hardware instructions, firmware, hardware, or a combination of software, firmware, and hardware. For example, the features of the driver performance assessment module 212 described herein may be implemented in or executed by a combination of processor(s) 202, memory 204, one or more communications interface components 206, a data store 208, and a user interface 210. In an example, the driver performance assessment module 212 may be encoded in a non-transitory computer-readable medium, such as the memory 204 or the data store 208. In addition, the communications interface components 206 are configured to interface with the one or more processors 202, the memory 204, and the data store 208 over one or more data buses. The communications interface components 206 also are able to establish wireless communications connections with remote systems, devices, and modules. The communications interface components 206 of the server computer(s) 200 may be configured to receive wireless inputs and, in response, generate outputs.

Figure 12:
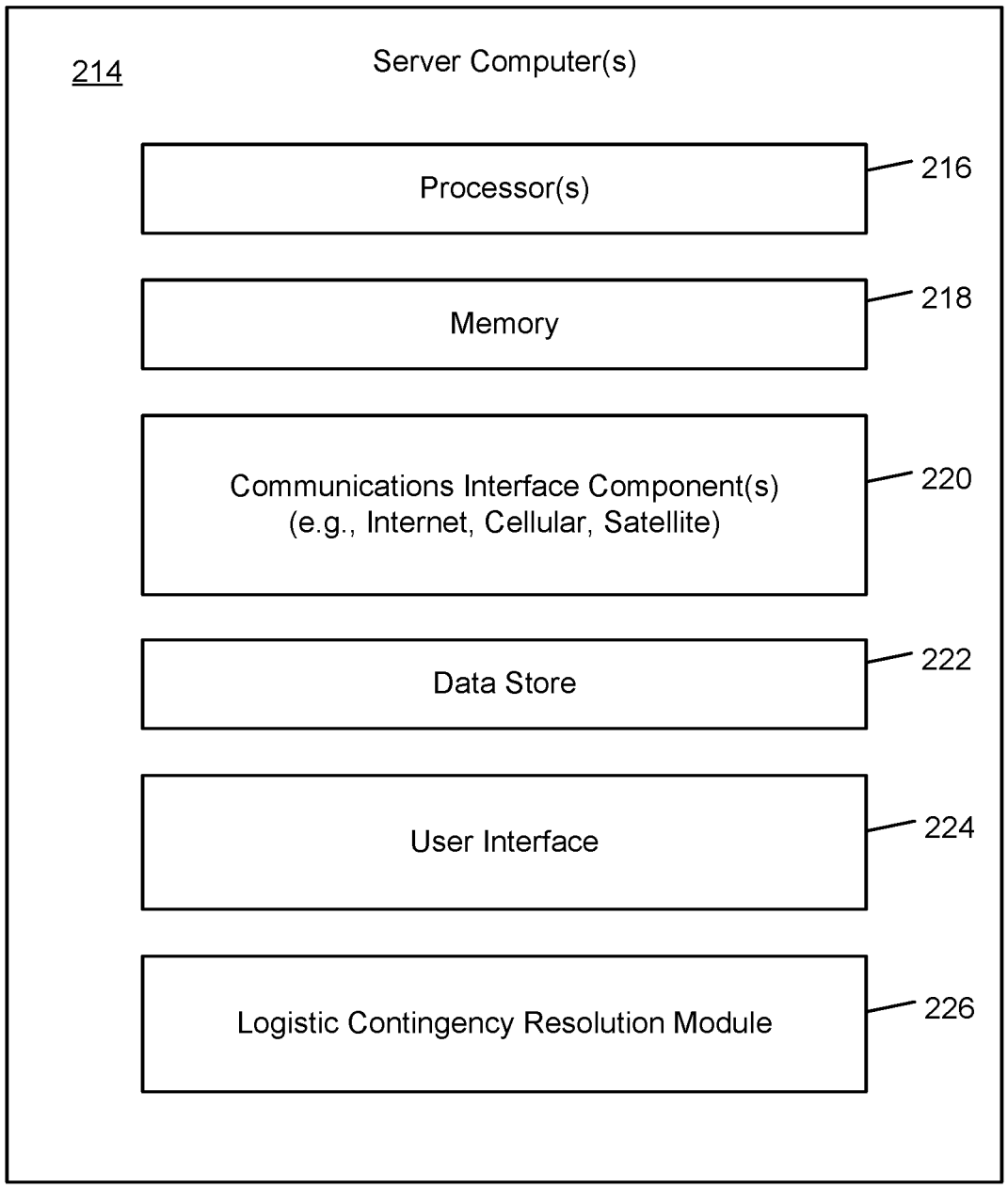
FIG. 12 is a block diagram of example components of a server computer.

FIG. 12 shows an example embodiment of the logistics management service 30 that includes a logistics contingency resolution module 226. In some examples, logistics management service 30 includes one or more server computers at least one of which includes a logistics contingency resolution module 226 for resolving events and additional components that assist in providing the various functionalities of the logistics management service 30. These additional components may be implemented in computer or processor readable software, hardware instructions, firmware, hardware, or a combination of software, firmware, and hardware. For example, the features of the logistics contingency resolution module 226 described herein may be implemented in or executed by a combination of one or more processors 216, memory 218, one or more communications interfaces 220, a data store 222, and a user interface 224. In an example, the logistics contingency resolution module 226 may be encoded in a non-transitory computer-readable medium, such as the memory 218 or the data store 222. In addition, the one or more communications interface components 220 are configured to interface with the one or more processors 216, the memory 218, and the data store 222 over one or more data buses. The one or more communications interface components 220 also are able to establish wireless communications connections with remote systems, devices, and modules. The communications interface component(s) of the one or more server computers 214 may be configured to receive wireless inputs and, in response, generate outputs.

III. CONCLUSION

Other embodiments are within the scope of the claims.

The invention claimed is:

1. A method comprising:
communicating, by a primary wireless network node associated with a first vehicle section of a vehicle, with a secondary wireless network node associated with a second vehicle section of a vehicle, using a first type of wireless communications interface;
determining, by the primary wireless network node, that the first vehicle section is compatible with the second vehicle section based on the communications with the secondary wireless network node and based on at least one of a first compatibility requirement of the first vehicle section and a second compatibility requirement of the second vehicle section; and
communicating, by the primary wireless network node, with a server associated with a tracking system, using a second type of wireless communications interface, wherein the communicating with the server comprises one or more of reporting data on the first vehicle section, data on the second vehicle section, and data on the compatibility between the first vehicle section and the second vehicle section.

2. The method of claim 1, further comprising:
establishing, by the secondary wireless network node, using a third type of wireless communications interface, respective wireless communications connections between the secondary wireless network node and peripheral wireless network nodes in the second vehicle section.

3. The method of claim 2, wherein the third type of wireless communications interface comprises one or more of: a Bluetooth communication system, a Long Range (LoRa) communication system, a Long Range Wide Area Network (LoRaWAN) communication system a WiFi communication system, and a radio frequency (RF) communication system.

4. The method of claim 1, wherein the second type of communications interface comprises a cellular communications interface.

5. The method of claim 1, wherein the first type of wireless communications interface comprises one or more of: a Bluetooth communication system, a Long Range (LoRa) communication system, a Long Range Wide Area Network (LoRaWAN) communication system a WiFi communication system, and a radio frequency (RF) communication system.

6. The method of claim 1, wherein the primary wireless network node comprises an electronic logging device (ELD) programmed to collect, analyze, and present vehicle driver performance data to a second network service.

7. The method of claim 1, further comprising:
storing, by the primary wireless network node, a first set of attributes characterizing capabilities of the first vehicle sections.

8. The method of claim 1, further comprising:
receiving, by the primary wireless network node, a first set of attributes characterizing capabilities of the first vehicle section; and receiving, by the primary wireless network node, a second set of attributes characterizing requirements of the second vehicle section from the secondary wireless network node, wherein the determining that the first vehicle section is compatible with the second vehicle section is based at least in part on the first set of attributes being compatible with the second set of attributes.

9. The method of claim 1, further comprising matching, by the primary wireless network node, the first vehicle section to the second vehicle section.

10. A system comprising:
a primary wireless network node in a first vehicle section comprising a driver compartment, wherein the primary wireless network node comprises a first type of wireless communications interface and a second type of communications interface, the primary wireless network node associated with a first set of attributes characterizing capabilities of the first vehicle section; and a secondary wireless network node in a second vehicle section comprising a cargo compartment, wherein the secondary wireless network node comprises the second type of communications interface and a third type of wireless communications interface, the secondary wireless network node associated with a second set of attributes characterizing requirements of the second vehicle section, wherein the primary wireless network node establishes, using the first type of wireless communications interface, a first wireless communications connection between the primary wireless network node and a server affiliated with a network service, the primary wireless network node establishes, using the second type of communications interface, a second communications connection between the primary wireless network node and the secondary wireless network node;

the secondary wireless network node establishes, using the third type of wireless communications interface, respective wireless communications connections between the secondary wireless network node and peripheral wireless network nodes in the cargo compartment that are affiliated with the network service, and the primary wireless network node and the secondary network node are programmed to determine compatibility between the capabilities of the first vehicle section and the requirements of the second vehicle section based on a first received set of attributes characterizing capabilities of the first vehicle section being compatible with a received second set of attributes characterizing requirements of the second vehicle section.

11. The system of claim 10, wherein the primary wireless network node or the secondary wireless network node comprises an electronic logging device (ELD) programmed to collect, analyze, and present vehicle driver performance data to a second network service.

12. The system of claim 10, wherein the primary wireless network node communicates one or more of reporting data on the first vehicle section, data on the second vehicle section, and data on the compatibility between the first vehicle section and the second vehicle section to the server over the first wireless communications connection.

13. The system of claim 10, wherein the peripheral wireless network nodes are associated with respective assets.

14. The system of claim 10, wherein the first vehicle section and the second vehicle section are separated by a physical barrier, and the primary wireless network node and the secondary wireless network node establish the second communications connection through the physical barrier.

15. The system of claim 10, wherein the capabilities and the requirements are expressed according to a structured description language.

16. The system of claim 10, wherein the secondary wireless network node is configured to detect events associated with the peripheral wireless network nodes and report the detected events to the primary wireless network node.

17. A system comprising:
a primary wireless network node in a first vehicle section comprising a driver compartment, wherein the primary wireless network node comprises a first type of wireless communications interface and a second type of wireless communications interface; and a secondary wireless network node in a second vehicle section comprising a cargo compartment, wherein the secondary wireless network node comprises the second type of wireless communications interface and a third type of wireless communications interface, wherein, the primary wireless network node establishes, with the first type of wireless communications interface, a first wireless communications connection between the primary wireless network node and a server affiliated with a network service, the primary wireless network node establishes, with the second type of wireless communications interface, a second communications connection between the primary wireless network node and the secondary wireless network node, the secondary wireless network node establishes, with the third type of wireless communications interface, respective wireless communications connections between the secondary wireless network node and peripheral wireless network nodes in the cargo compartment that are affiliated with the network service, and the primary wireless network node or the secondary wireless network node comprises an electronic logging device (ELD) programmed to collect, analyze, and present vehicle driver performance data to a second network service.

18. The system of claim 17, wherein the third type of wireless communications interface comprises one or more of: a Bluetooth communication system, a Long Range (LoRa) communication system, a Long Range Wide Area Network (LoRaWAN) communication system a WiFi communication system, and a radio frequency (RF) communication system.

19. The system of claim 17, wherein the first type of wireless communications interface comprises a cellular communications interface.

20. The system of claim 17, wherein the first type of wireless communications interface comprises one or more of: a Bluetooth communication system, a Long Range (LoRa) communication system, a Long Range Wide Area Network (LoRaWAN) communication system a WiFi communication system, and a radio frequency (RF) communication system.

* * * * *